(12) United States Patent
Lorenzelli et al.

(10) Patent No.: US 6,408,881 B2
(45) Date of Patent: Jun. 25, 2002

(54) FAUCET DEVICE TO DELIVER AND MIX WATER

(75) Inventors: Mauro Lorenzelli, Bergamo; Gabriele Sarasini, Bovegno, both of (IT)

(73) Assignee: Nuova Galatron Srl, Castiglione Delle Stiveiere (MN) (IT)

( * ) Notice: Subject to any disclaimer, the term of this patent is extended or adjusted under 35 U.S.C. 154(b) by 0 days.

(21) Appl. No.: 09/769,110

(22) Filed: Jan. 25, 2001

(30) Foreign Application Priority Data

Jan. 25, 2000 (IT) ......................................... UD00A0012

(51) Int. Cl.[7] .............................. F16K 31/02; C03C 1/05
(52) U.S. Cl. ............. 137/624.11; 137/801; 251/129.04; 4/623
(58) Field of Search .................. 137/624.11, 624.12, 137/801; 251/129.04; 4/623

(56) References Cited

U.S. PATENT DOCUMENTS

| 4,604,764 A | * | 8/1986 | Enzo .............................. 4/623 |
| 5,062,164 A | | 11/1991 | Lee et al. |
| 5,080,324 A | * | 1/1992 | Chi .......................... 251/129.04 |
| 5,911,240 A | * | 6/1999 | Kolar et al. ............ 137/624.11 |
| 6,003,170 A | * | 12/1999 | Humpert et al. ..... 251/129.04 X |

FOREIGN PATENT DOCUMENTS

| EP | 0 831 260 | 3/1998 |
| EP | 0 936 317 | 8/1999 |
| WO | 97/47828 | 12/1997 |

OTHER PUBLICATIONS

Copending U.S. application No. 09/769,229.

* cited by examiner

*Primary Examiner*—Kevin Lee
(74) *Attorney, Agent, or Firm*—Akin, Gump, Strauss, Hauer & Feld, L.L.P.

(57) ABSTRACT

A device (10) to deliver and mix water for taps (12), the device includes a mixer cartridge (30), arranged inside a monoblock (11) of the tap (12). A handle (45) regulates the mixing of the water. An actuation device is arranged above the monoblock (11). The actuator device is able to determine the opening and closing of the flow of water, with the actuation device being commanded electrically and including a membrane (20) able to cooperate with the mixer cartridge (30).

21 Claims, 1 Drawing Sheet

FAUCET DEVICE TO DELIVER AND MIX WATER

FIELD OF THE INVENTION

The invention concerns a device for to deliver and mix water able to be employed in electronically controlled taps wherein delivery is commanded, substantially automatically, through sensor means which detect the presence of the user.

BACKGROUND OF THE INVENTION

The state of the art includes monocommand mixer taps comprising a mixer cartridge, located inside the monoblock of the tap, associated with a lever, which allows to regulate both the mixing and the delivery of the water, and which is mounted above the monoblock.

The state of the art also includes taps of the electronic type wherein the water is delivered substantially automatically when the user approaches the taps.

Such taps comprise a valve provided with interception means cooperating with a solenoid device, or with an electric motor, able to command the opening and closing thereof, respectively to deliver and interrupt the flow of water; the solenoid device or the motor is activated by appropriate sensor means able to detect the presence of the user.

In some embodiments, the valve is associated with manual activation means which allow to regulate the mix of hot and cold water.

The structure of this type of valve and the need to feed the solenoid device or drive motor of the interception means electrically make it necessary to locate the valve and the electric and electronic components in the lower part of the monoblock, or cast block, of the tap, which therefore must be appropriately sized.

This means that it is necessary to design and make specific monoblocks for the electronically controlled taps, that is, different from those for monocommand mixer taps, with greater problems in terms of planning the production and managing stocks.

Moreover, the greater size of the monoblock considerably limits the design and aesthetics of the tap.

Furthermore, the presence of electric and electronic parts inside the monoblock in the zone where the water passes can cause malfunctions of the tap and can compromise the safety of the user.

The present Applicant has devised and embodied this invention to overcome these shortcomings and to obtain further advantages.

BRIEF SUMMARY OF THE INVENTION

The invention is set forth and characterized in the main claim, while the dependent claims describe other characteristics of the invention.

The purpose of the invention is to achieve a device for the automatic delivery of water, which can be associated with a monoblock for mixer taps of a substantially standardized type, that is, of the type for monocommand mixer taps, thus obviating the need to produce a specific monoblock for electronically controlled mixer taps.

Another purpose of the invention is to achieve a device for the automatic delivery of water which is practical, functional and compact and can be used in conditions of absolute safety for the user.

The device according to the invention comprises a mixer cartridge, able to be arranged inside a monoblock for mixer taps of a conventional type, means to regulate the mixing of the water and actuation means, commanded electrically, and comprising an interception element cooperating with said cartridge to open and close the flow of water.

The actuation means can be associated above the mixer cartridge, in a position outside the monoblock of the tap, and cooperate with a sensor able to automatically determine the activation of said actuation means in the presence of the user.

In one embodiment of the invention, the actuation means are fed by batteries.

In a preferential embodiment, the means to regulate the mixing, the actuation means and the electric and electronic components connected thereto are integrated into a single block able to be coupled above the mixer cartridge in a position outside the monoblock.

The device according to the invention is therefore able to be associated with monoblocks for monocommand mixer taps and thus allows to obviate both the problem of stylistic limitations and design imposed by the devices for electronically controlled taps, and also the problem of production and storage of different types of monoblock.

The separation of the electric and electronic parts from the mixer cartridge confers characteristics of extreme safety and functionality on the device according to the invention.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
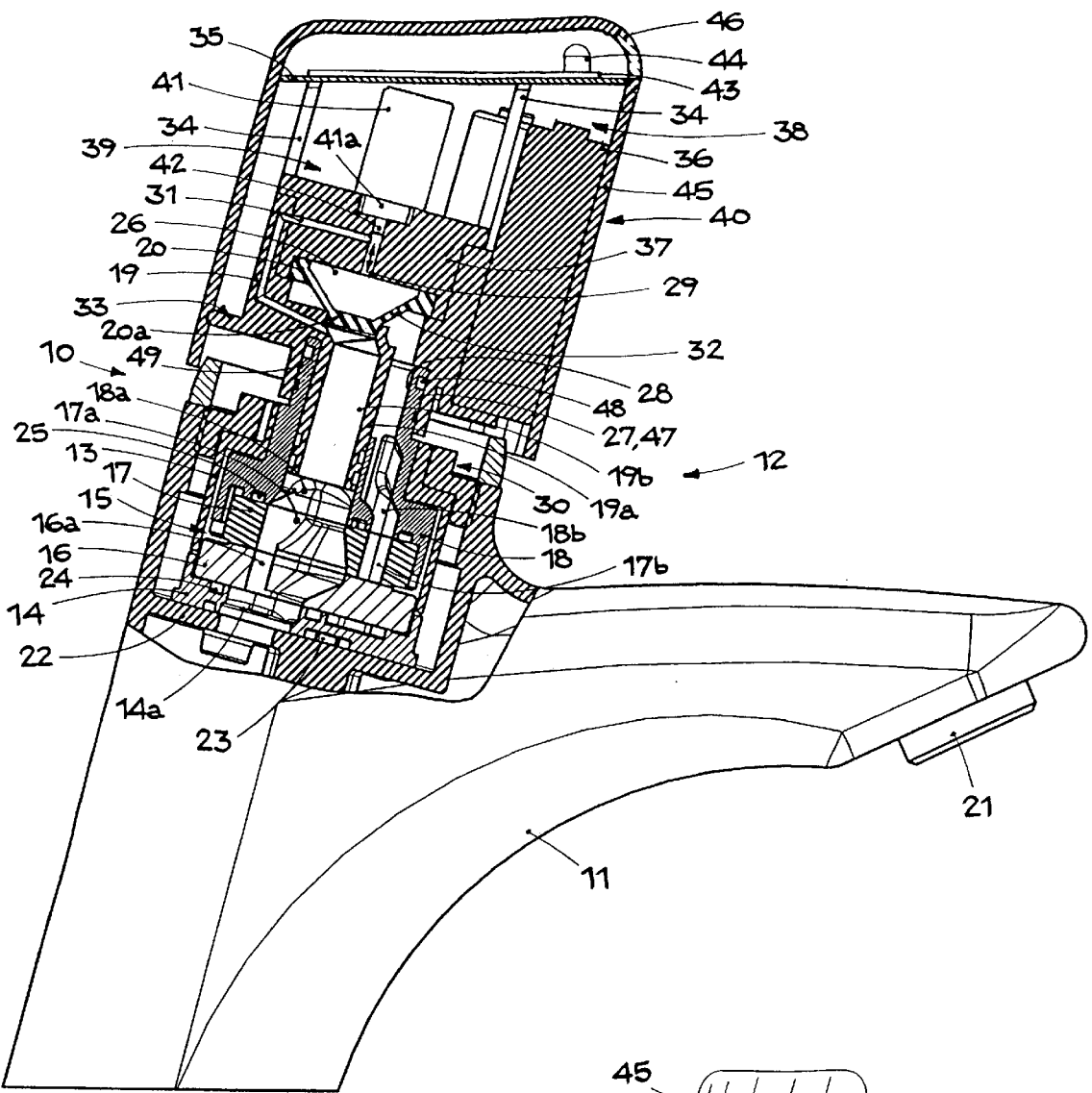
FIG. 1 shows a longitudinal section of a device according to the invention associated with the monoblock of a tap.
Figure 2:
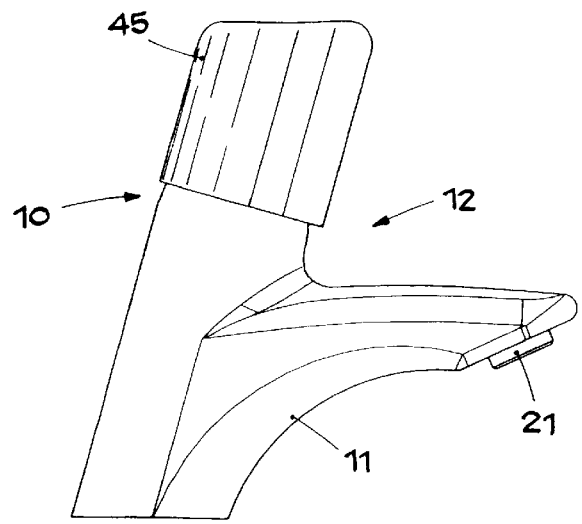
FIG. 2 is a side view of a tap provided with the device according to the invention.

With reference to the attached drawings, a device 10 to deliver and mix water according to the invention is able to be associated with the monoblock 11 of taps 12 of a substantially standardized type.

The device 10 comprises a mixer cartridge 30 associated at the upper part with a command and regulation unit 40.

The mixer cartridge 30 is able to be housed in the upper part of the monoblock 11 and comprises a containing body 13 closed at the bottom part by a bottom 14 of a substantially conventional type and defining therewith a compartment 15 which houses: a fixed platelet 16, a movable platelet 17, and a drawing and distribution element 18.

The bottom 14 can be associated with the monoblock 11 in correspondence with a supporting plane 22 and is provided with holes able to allow the passage of the hot and cold water arriving from the pipes of the water system and with an aperture 14a able to allow the mixed water to flow towards the delivery outlet 21 of the tap 12.

The fixed platelet 16 is able to be solidly associated with the bottom 14 and has feed holes functionally connected to the hot and cold water holes of the bottom 14 and a hole 16a communicating with the aperture 14a.

The movable platelet 17 is mounted rotary on a plane parallel to and above that of the fixed platelet 16; it is provided with a hole 17a able to cooperate with the hole 16a and with a curved eyelet 17b able to communicate selectively with only one or both the feed holes of the fixed platelet 16.

The drawing and distribution element 18 is associated, due to its having the same shape, above the movable platelet 17 and is therefore able to rotate solidly therewith.

The drawing and distribution element 18 comprises a central aperture, or discharge or outlet aperture 18a, communicating with the hole 17a and a peripheral aperture 18b communicating with the eyelet 17b.

Sealing elements 23, 24, 25 are provided respectively between the bottom 14 and the supporting base 22, between the bottom 14 and the fixed platelet 16 and between the movable platelet 17 and the drawing and distribution element 18.

The upper part of the drawing and distribution element 18 protrudes with respect to the containing body 13 and has a knurling 27 on the perimeter and, at the center, a cavity 28 opening upwards.

The command and regulation unit 40 comprises a base 33 and a handle 45, which can be solidly associated with the latter and is hollow inside, able to contain: a drive member 41 provided with a piston 42, feeder batteries 36 and an electronic circuit 43.

The base 33 is provided at the center with a hole 49 on the inner wall of which there is a knurling 47 able to couple with the knurling 27 of the drawing and distribution element 18.

The base 33 is also provided with a central body 19, hollow on the inside, which extends in a tubular extension 19a located inside the hole 49 and protruding at the lower part with respect thereto.

The tubular extension 19a is able to be inserted and clamped inside the cavity 28, putting its axial hole 19b into communication with the central aperture 18a of the drawing and distribution element 18. The central body 19 is associated at the upper part with a block 37 with which it internally defines a chamber 26 inside which the membrane 20 is housed.

To be more exact, the membrane 20 is peripherally constrained between the central body 19 and the block 37 and has an extension 20a on the lower part which in its normal condition, that is, when the tap 12 is closed, closes the axial hole 19b at the upper part.

The membrane 20 is also provided with a small through hole 32 located in correspondence with the peripheral aperture 18b and able to make the latter communicate with the chamber 26.

The block 37 has at the center a first channel 29 communicating with the chamber 26 and with a second channel 31 made partly on the block 37 itself and partly on the central body 19.

The second channel 31 communicates with the axial hole 19b below the membrane 20.

A plurality of supports 34 are also mounted on the block 37, which are able to support a plate 35 on which the electronic circuit 43 is mounted.

The base 33 and the plate 35, together with the central body 19 and the block 37, define the seating 39 for the drive member 41 at the center and, on the periphery, seatings 38 for the batteries 36.

The drive member 41, which can consist of a solenoid device or an electric motor, is fed by the batteries 36 and comprises an extension 41a able to be constrained, for example screwed, to the block 37 in correspondence with the first channel 29.

The drive member 41 is able to move the piston 42 axially, permitting it to be selectively inserted into the first channel 29.

To be more exact, the piston 42 is able to be taken from an extracted position, wherein it closes the first channel 29 and prevents it from communicating with the second channel 31, to a retracted position, wherein it leaves the first channel 29 free.

According to a variant, the piston 42 is able to close only, or also, the second channel 31.

The electronic circuit 43 is able to manage the drive member 41 according to what is detected by a presence sensor 44 associated therewith.

The sensor 44 is covered at the front part by an insert 46 associated with the handle 45.

When the device 10 is assembled, the command and regulation unit 40 is mounted above the mixer cartridge 30, and in a position outside the monoblock 11, due to the coupling between the knurling 27 of the drawing and distribution element 18 and the knurling 47 of the base 33, and also between the tubular extension 19a and the cavity 28.

The stability of this coupling is ensured by the presence of an elastic clamping ring 48 which prevents the command and regulation unit 40 from coming off.

The device 10 as described heretofore functions as follows.

When there is nobody near the tap 12, the drive member 41 is inactive and has the piston 42 in the extracted position, that is, closing the first channel 29.

In this condition, the chamber 26 is in communication, by means of the through hole 32, with the peripheral aperture 18b only.

The water arriving from the pipes of the water system therefore rises from the peripheral aperture 18b, through the through hole 32, into the chamber 26, compressing the membrane 20 which closes the axial hole 19b at the upper part and therefore prevents the water from flowing towards the central aperture 18a and then to the delivery outlet 21.

When the user approaches the tap 12, the sensor 44 detects the presence and, through the electronic circuit 43, causes the activation of the drive member 41 which takes the piston 42 to the retracted position, leaving the first channel 29 free which is therefore in communication with the second channel 31 and with the central aperture 18a.

In this condition the pressure inside the chamber 26 is substantially atmospheric pressure, therefore the water under pressure arriving from the peripheral aperture 18b raises the extension 20a of the membrane 20 which frees the upper aperture of the axial hole 19b, allowing the water to pass and flow towards the delivery outlet 21 through the central aperture 18a and the holes 17a, 16a and 14a.

When the user moves away from the tap 12, the sensor 44, no longer detecting any presence, causes the de-activation of the drive member 41 which takes the piston 42 to the extracted position wherein the tap 12 is closed.

According to a variant, a timer is associated with the electronic circuit 43 and is able to de-activate the drive member 41 after a pre-determined time, which can be programmed as desired, from its activation.

The temperature of the water delivered can be regulated by making the handle 45 rotate, which, being constrained through the base 33 to the drawing and distribution element 18, causes a mating movement of the latter and hence of the movable platelet 17, thus varying the flow rates of hot and cold water to be mixed.

It is obvious however that modifications and/or additions can be made to the device 10 as described heretofore, but these shall remain within the field and scope of the invention.

For example, the mixer cartridge 30 can have different components from those shown and described here and the bottom 14 can be replaced by another, functionally equivalent element.

It is also obvious that, although the invention has been described with reference to specific examples, a person of skill shall certainly be able to achieve many other equivalent forms of the device to deliver and mix water, all of which shall come within the field and scope of the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A device to deliver and mix water for a tap (12), said device comprising a mixer cartridge (30), arranged inside a monoblock (11) of the tap (12), a handle (45) operationally associated with the mixing cartridge (30) to regulate the mixing of the water, an actuation device, arranged above said monoblock (11), which controls an opening and closing of a flow of water through the mixing cartridge, said actuation device being commanded electrically and controlling a membrane (20) which cooperates with said mixer cartridge (30) to allow flow of water through said mixing cartridge (30).

2. Device as in claim 1, characterized in that said actuation device includes a movable element (42) which controls said membrane.

3. Device as in claim, 1 characterized in that said actuation device is commanded by drive means associated with at least a presence sensor (44).

4. Device as in claim 3, characterized in that said drive means (41) comprise at least a solenoid device.

5. Device as in claim 3, characterized in that said drive means (41) comprise at least an electric motor.

6. Device as in claim 3, characterized in that said drive means (41) are fed by batteries (36).

7. Device as in claim 3, further including a command and control unit (40), which is located above said mixer cartridge (30) in a position outside said monoblock (11), into which said actuation device (42), said drive means (41), presence sensor (44) and an electronic circuit (43) are integrated.

8. Device as in claim 3, characterized in that timer means are associated with said drive means (41) in order to automatically de-activate said drive means (41) after a pre-determined time from when said sensor (44) detects the presence of a user.

9. Device as in claim 8, characterized in that said timer means are selectively programmable.

10. Device as in claim 6, characterized in that a unit (40) comprises housing seatings (38) for said batteries (36).

11. Device as in claim 1, characterized in that a command and control unit (40) integrally includes said handle (45) to regulate the mixing.

12. Device as in claim 11, characterized in that the function of said handle (45) is to cover and protect the components of said command and control unit (40).

13. Device as in claim 7, characterized in that said mixer cartridge (30) comprises water distribution means (18) protruding from said monoblock (11) on which said unit (40) can be coupled.

14. Device as in claim 13, characterized in that said unit (40) and said mixer cartridge (30) cooperate with reciprocal clamping means (48).

15. Device as in claim 2, characterized in that said movable element (42) is able to assume at least a first position defining a closing of the tap (12) and a second position defining an opening of said tap (12).

16. Device as in claim 15, characterized in that said movable element consists of a piston (42) able to assume an extracted position wherein the tap (12) is closed and a retracted position wherein the tap (12) is open.

17. Device as in claim 16, characterized in that said membrane (20) is housed in a chamber (26) located in communication with said mixer cartridge (30), said membrane (20) assumes a first position wherein the membrane (20) does not allow the water to be delivered from the tap (12), defined by the extracted position of said position (42), and a second position wherein the membrane (20) allows said delivery, defined by the retracted position of said piston (42).

18. Device as in claim 13, characterized in that a chamber (26) communicates with a channel (29, 31) which is selectively closed by a piston (42), and cooperates with said distribution means (18), said channel (29, 31) being closed in the extracted piston of said piston (42), and allowing said chamber (26) to be filled with water so as to maintain said membrane (20) in a first position wherein the membrane (20) does not allow the water to be delivered from the tap (12), and said channel (29, 31) being open in the retracted position of said piston (42) to allow said membrane (20) to be arranged in a second position wherein the membrane (20) allows the water to be delivered from the tap (12).

19. Device as in claim 18, characterized in that said chamber (26) communicates with a delivery outlet (21) by means of two inter-connected channels (29, 31), at least one (29 or 31) of said channels being selectively closed by said piston (42).

20. Device as in claim 18, characterized in that said membrane (20) is lowered in said first position and is raised at least partly in said second position due to an effect of the pressure of the water passing in said distribution means (18).

21. Device as in claim 18, characterized in that said membrane (20) is provided with a through hole (32), cooperating with said distribution means (18), which allows said chamber (26) to be filled with water.

\* \* \* \* \*